Aug. 6, 1957  P. E. CLAUS ET AL  2,801,507
METHOD AND APPARATUS FOR SEALING CONTAINERS
Filed May 28, 1954  5 Sheets-Sheet 2
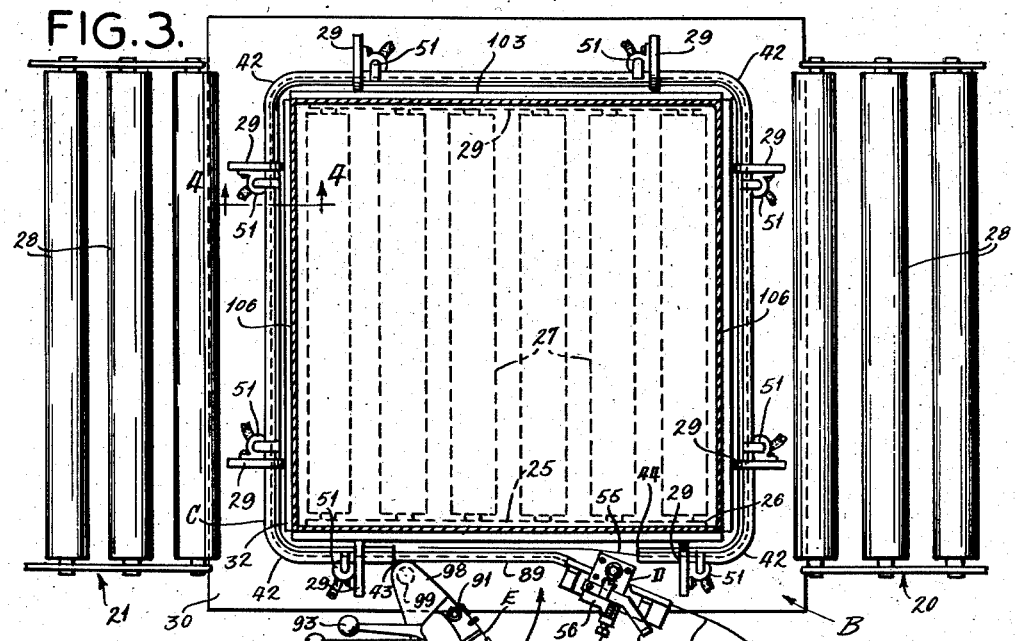
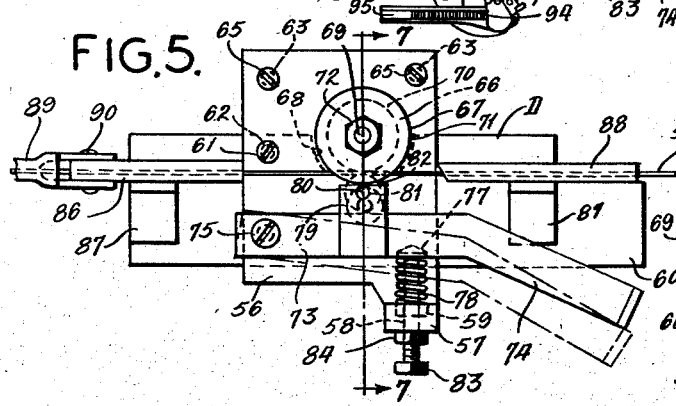
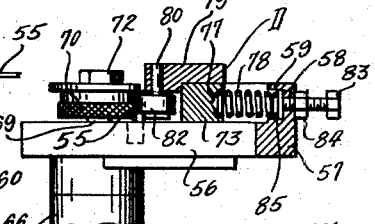
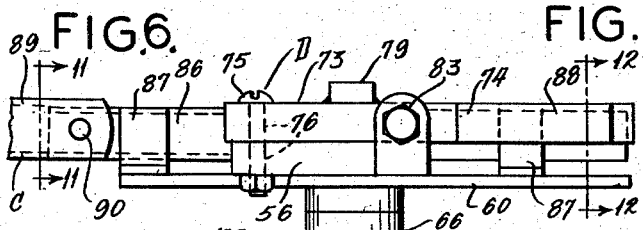
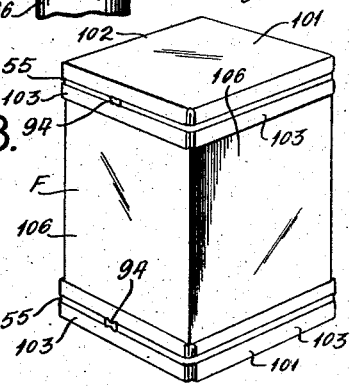
INVENTOR:
PAUL E. CLAUS
HENRY C. HOENER
By William Thyl
ATTORNEY

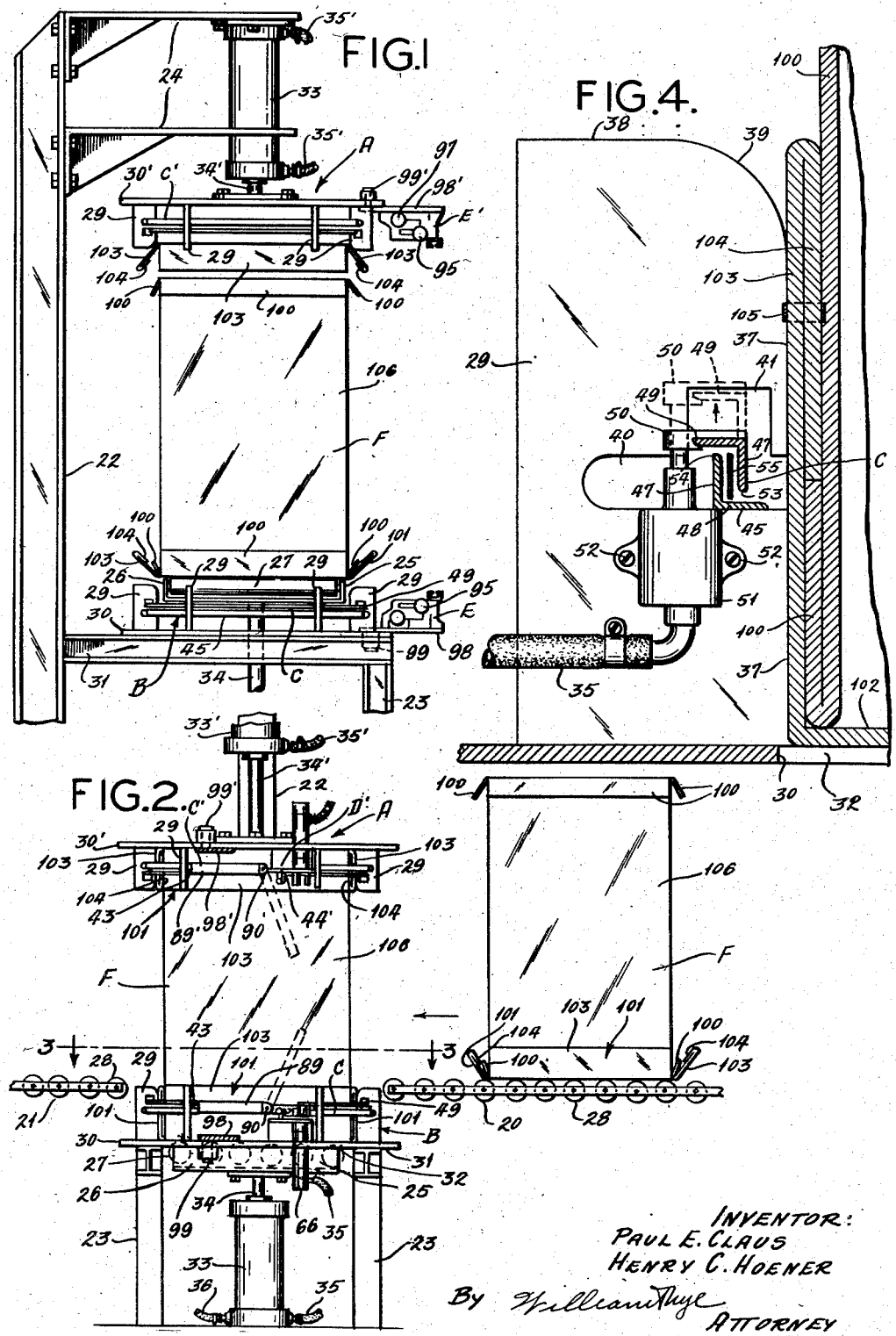

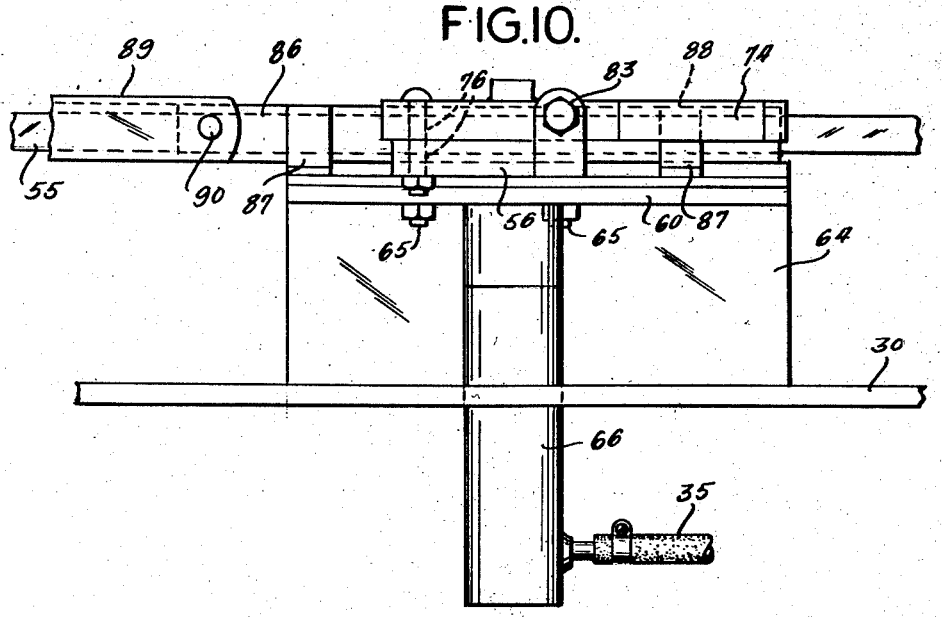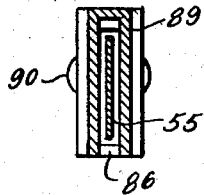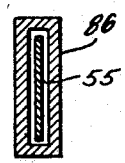

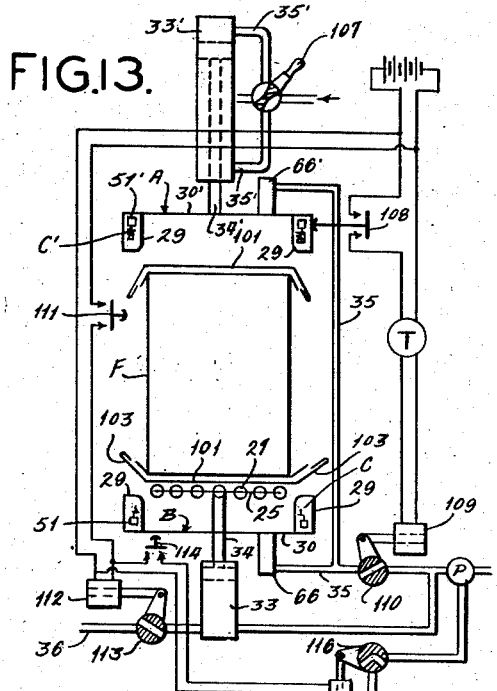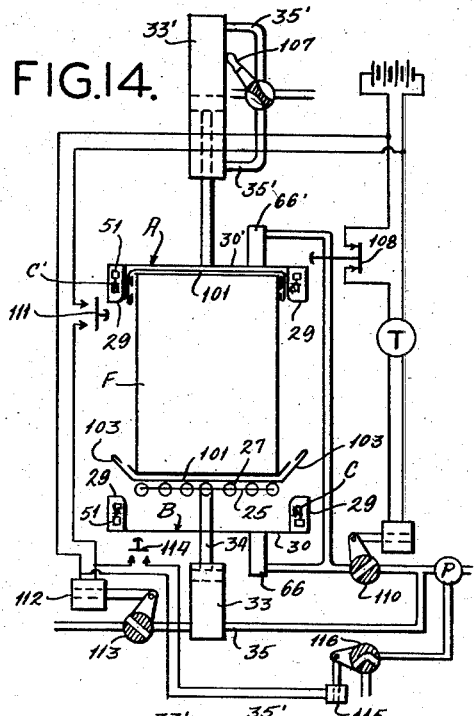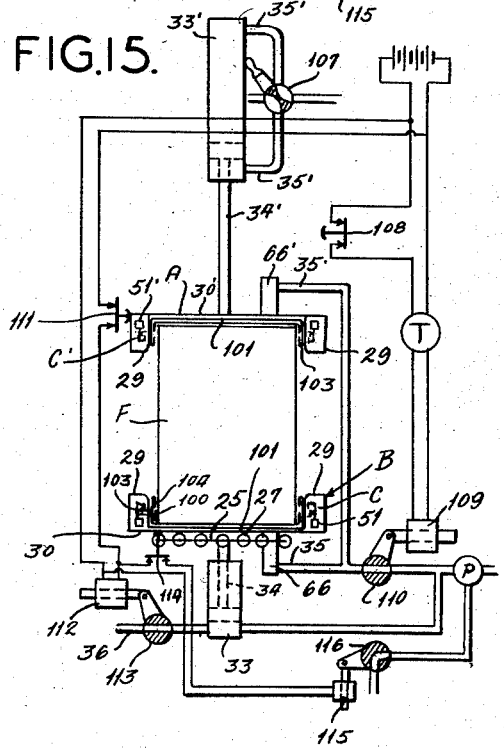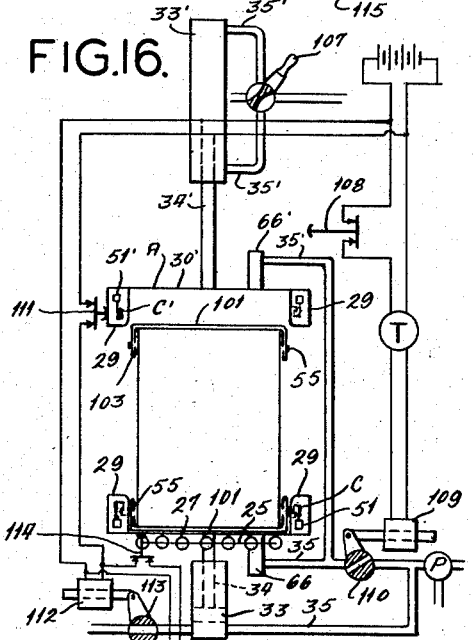
INVENTOR:
PAUL E. CLAUS
HENRY C. HOENER
By William Thyl
ATTORNEY

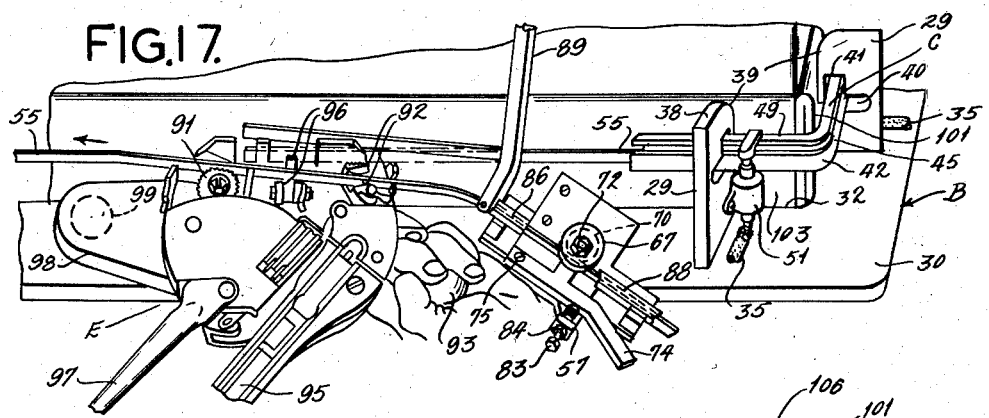
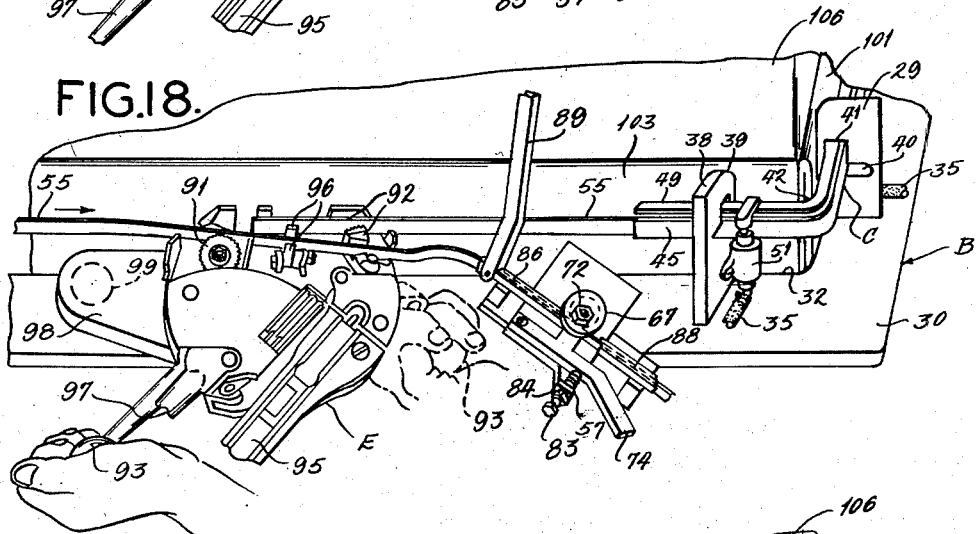
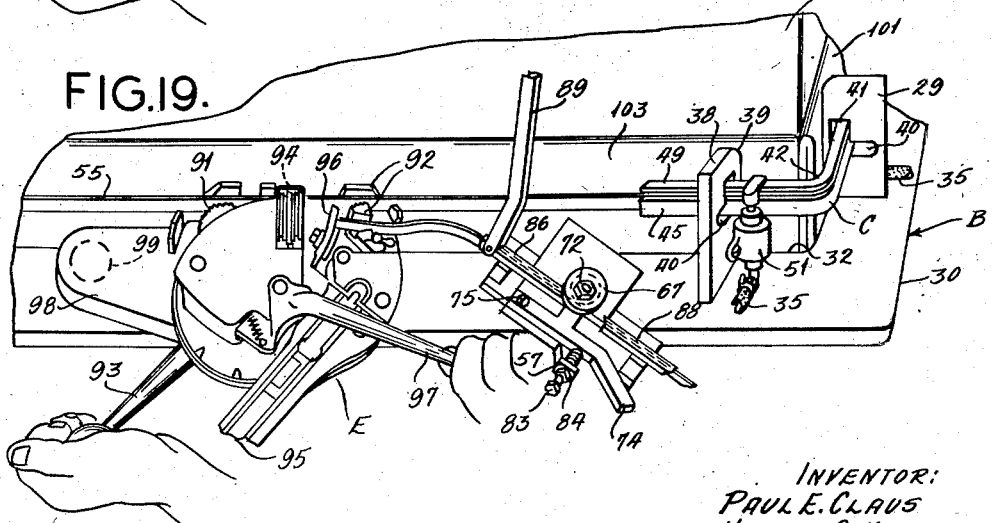

United States Patent Office

2,801,507
Patented Aug. 6, 1957

2,801,507

METHOD AND APPARATUS FOR SEALING CONTAINERS

Paul E. Claus, Kirkwood, and Henry C. Hoener, Webster Groves, Mo., assignors, by mesne assignments, to Crown Zellerbach Corporation, San Francisco, Calif., a corporation of Nevada Application May 28, 1954, Serial No. 433,143

10 Claims. (Cl. 53—198)

This invention appertains to a machine and process for applying banding means to a container, and more particularly to the means and process of applying closure caps to containers manufactured of corrugated fibreboard, solid fibreboard or any other suitable, bendable material and positioning and securing strapping or banding means thereabout.

The apparatus of this invention is particularly adaptable for use in rapid, high speed, automatic conveyor or "assembly line" operation with a minimum of manual assistance.

Many popular types of containers are constructed of corrugated fibreboard, solid fibreboard or similar materials and employ strapping or banding to seal the container for shipment. Some styles of the containers utilize tubular body members and separate top and bottom closure caps. Various means for placing the banding means and securing the closure caps to the body member are employed. For instance, in some containers, the closure caps have marginal flaps which interlock and engage into adjacent marginal flaps which are integral with the body member. The closure caps are permanently maintained in position by banding means, such as flat steel straps, wire or other suitable devices. In the applications wherein the entire container is banded and no separate closure is employed, it is unnecessary to provide, in conjunction with a band applying device, means for folding or positioning various components of the container. However, with various styles of containers employing separate closure caps, it has been found desirable to provide rapid, high speed means for folding the closure flaps into secure engagement with the body members in addition to means to feed, position and secure the strapping around the closure members without substantial manual assistance.

Certain problems arise in the positioning of the closure members onto the body section and in feeding the strapping means around the container. For example, the majority of the containers of the type usually employing the illustrated class of closure member are of square, rectangular or other polygonal shape, and therefore are inherently difficult to gird with relatively stiff, resilient strapping means which is usually packed in rolls and inherently tends to travel in a circular path. Ordinary track or guiding means are inadequate since the band will often tend to foul against the side of the track or against the side of the container. Furthermore, when securing rectangularly shaped containers, the band will tend to gouge or engage the corners of the container unless properly guided in a suitable track. It is also important that the strapping means be positioned accurately with respect to the container so that it will remain properly in place during shipping and handling. It is, therefore, an object of this invention to provide a machine and process for permanently sealing and banding containers by automatically applying encircling banding means and securing these means fixedly in position.

It is a further object of this invention to provide a container sealing machine and process which may be readily adapted to be installed in a conveyor line.

Another object is to provide a machine and process which may be used to substantially, simultaneously form and apply top and bottom closure members to a container, wherein the closure forming means are provided with band or strap feeding devices.

A still further object is to provide a machine for banding a container and a process which employs strap guiding means which follow closely the configuration of the container and which have movable side portions positioned adjacent the container and adapted to retract to permit the strap to be removed from the guiding means and accurately positioned with respect to the container closure.

Another object is to provide a machine and process which may be readily adapted to employ standard commercial strap or band securing and tightening devices.

Other objects and advantages will be apparent from the following description.

An embodiment of this invention is illustrated in the accompanying drawings wherein:

Fig. 1 is a side elevation of a closing and sealing device employing this invention;

Fig. 2 is a front, fragmentary view of the closing and sealing device illustrated in Fig. 1, shown positioned in alignment with a standard roller conveyor;

Fig. 3 is a horizontal, sectional view along lines 3—3 of Fig. 2;

Fig. 4 is a fragmentary, vertical, sectional view along lines 4—4 of Fig. 3;

Fig. 5 is an enlarged top view of the strap feeding mechanism embodying this invention;

Fig. 6 is an enlarged front view of the strap feeding mechanism shown in Fig. 5;

Fig. 7 is a vertical, sectional view along lines 7—7 of Fig. 5;

Fig. 8 is a perspective view of a container closed and sealed by the apparatus and process of this invention;

Fig. 9 is a perspective view of a closure member adapted to fit onto the container as shown in Fig. 8;

Fig. 10 is an enlarged front view of the strap feeding mechanism illustrated in Figs. 5 and 6 shown connected to a supporting bracket;

Fig. 11 is a vertical, sectional view through 11—11 of Fig. 6;

Fig. 12 is a vertical, sectional view through 12—12 of Fig. 6;

Fig. 13 is a schematic drawing of an apparatus employing this invention and illustrating the air actuated component parts and the electric control system. Fig. 13 shows the apparatus immediately prior to the closing and sealing operation;

Fig. 14 is a schematic diagram of the apparatus shown in Fig. 13 wherein the top closure member has been positioned in place;

Fig. 15 is a schematic diagram of the apparatus illustrated in Fig. 13 when both the top and bottom closure members have been positioned in place;

Fig. 16 is a schematic diagram of the apparatus shown in Fig. 13, wherein the top closure has been retracted preparatory to removal of the sealed container;

Fig. 17 is a fragmentary, perspective view illustrating the feeding of the strapping means through a standard strapping device employed with this invention;

Fig. 18 is a fragmentary, perspective view of the strapping means being tightened within a standard strap applying device; and Fig. 19 is a fragmentary, perspective view of the strap securing means being sealed and severed from the strap supply means.

Description of the apparatus

The particular machine illustrated is designed to apply top and bottom closure caps to a tubular body member as well as apply banding means to the container. Referring in general to Figs. 1 and 2, the device consists essentially of a top sealing means A and a bottom sealing means B placed in alignment with an output conveyor portion 21. A suitable stand or support 22 is connected to a base member 23 which provides for a pair of spaced top arms 24 to which certain portions of the top sealing means A are rigidly secured. In the embodiment of the device illustrated, the bottom sealing means B employs movable conveyor section 25 made up of a rigid frame 26 supporting horizontally disposed, freely rotatable rollers 27. The rollers 27 are substantially identical with the rollers 28 of the input conveyor section 20 and the output conveyor section 21, however, as illustrated in Fig. 3, in the particular embodiment shown, they may be slightly shorter in length in order to substantially correspond with the dimensions of the bottom container closure.

Opposing pairs of spaced upright closure forming guides 29 are secured to a rigid bottom frame 30 which, in turn, is firmly secured to horizontal members 31 which form a part of the base member 23. The bottom frame 30 is provided with an opening 32 of such size to permit the movable conveyor section 25 to be retracted downwardly therethrough so that the top surface of the rollers 27 may be retracted to a position in substantially flush relationship with the bottom frame 30, as shown in Fig. 2.

A bottom air cylinder 33 is positioned in spaced, vertical alignment with the opening 32 and is provided with a shaft 34 which is secured to the rigid frame 26 of the movable conveyor section 25. The bottom air cylinder 33 is of suitable size and capacity to position the movable conveyor section 25 vertically upwardly and downwardly in timed relationship, as described later, with the closing and sealing process. Inlet and outlet air supply tubes 35 and 36, respectively, are provided at the base of the bottom air cylinder 33.

The closure forming guides 29 are secured in spaced relationship to the upper surface of the bottom frame 30 as best shown in Figs. 2 and 3. In the embodiment illustrated, a total of eight closure forming guides 29 are employed, however, the number of guides may be varied to adapt the machine for a particular type of container. For example, if it was desired to seal an octagonal container, the forming guides 29 would be positioned in proper relation to receive the octagonally shaped closure members. The guides 29 are positioned in opposing pairs so that their vertical surfaces 37 will be in firm contacting relationship with the adjacent outer face of the container closure as shown in Fig. 4. In the device illustrated, the closure forming guides are provided with flat horizontal top surfaces 38 and rounded intermediate surfaces 39 to facilitate the easy sliding of the container closure into position. Each closure forming guide is positioned with a spaced horizontal slot 40 extending from the vertical surface 37. In the particular device, as shown in Fig. 4, the slot 40 is provided with a vertical, upstanding slot portion 41. The purpose of the vertical slot portion 41 is to accommodate certain parts of the apparatus which will be fully described in the following portions of the description. The horizontal slots 40 and upstanding slot portions 41 of each closure forming guide 29 are placed in the same relative position so that they will be in substantial horizontal and vertical alignment with adjacent guides on the bottom sealing means B. A two-piece track member C is positioned within the horizontal slot 40 and the upstanding slot 41. The track member C is of suitable dimension to receive the desired type of strapping or banding means. In the embodiment illustrated, the track member C is provided with curved corner portions 42 to facilitate the easy passage of the strapping or banding material. The bottom track as illustrated is provided with an inlet end 43 and an outlet end 44. A substantial space or void between the two track ends 43 and 44 is provided to accommodate other tools and devices which form a part of the embodiment of the invention illustrated.

The track member C comprises an L-shaped bottom track 45, shown in Fig. 4, which is rigidly secured to the lower edge 46 of the horizontally slotted portion of the closure forming guides 29. As further illustrated in Fig. 4, the vertical leg portion 47 of the L-shaped bottom track is positioned in spaced, substantially parallel relation to the vertical surface 37. The horizontal leg portion 48 is positioned to extend toward the vertical surface 37 of the forming guide 29. A cooperating top track 49 is vertically, movably positioned within the upstanding slotted portion 41 of the closure forming guides 29. The top track 49 is, in effect, positioned in opposing, cooperating relation with the bottom track 45. More particularly, the vertical leg portion 47 of the top track 49 is disposed in spaced, substantially parallel relation from the vertical leg portion 47 of the bottom track 45 and positioned more closely adjacent the vertical edge 37 of the forming member 29. The horizontal leg portion 48 of the top track 49 is disposed away from the vertical edge 37 and is connected to a horizontal clamp arm 50. The horizontal arm, in turn, is rigidly secured to a vertical motion imparting device such as an air clamp 51, as illustrated in Figs. 3 and 4. The air clamp 51 is secured to the closure forming guides 29 by means of threaded fastenings 52 or other desired means. The movement of the horizontal arm and the top track is illustrated by the broken lined portion shown in Fig. 4. At the upper limit of the travel of the top track 49, the lower corner 53 of the vertical leg portion 47 will be positioned above the upper corner 54 of the bottom track 45. An air inlet supply hose 35 is connected to the air clamp 51.

Each of the closure forming guides 29 is provided with an air clamp and track device C as described, so that the air clamps 51 may be operated so as to simultaneously elevate the entire top track member 49 into the raised position shown in Fig. 4 in the broken line portion.

In the illustrated embodiment of the invention, banding means, such as steel strap 55 from a suitable source G, is driven through the two-piece track member C by means of a timed driver unit D, illustrated in Figs. 5, 6 and 7. The driver unit D has a central frame member 56 which, in turn, is provided with an upstanding lug portion 57, drilled with a small opening 58 and an axially aligned, spring-receiving opening 59. A separate track plate 60 is adapted to be in flatwise relation against the bottom edge of the driver frame member 56. A bolt receiving opening 61 extends through the driver frame member 56 and the track plate 60. A threaded fastening 62 is positioned through the opening 61 and tightly secured in place. When the threaded fastening 62 is loosened, the track plate 60 may be moved with respect to the driver frame member 56 for minor adjustment. The driver frame member 56 is provided with a pair of spaced openings 63 adapted to receive threaded fastenings 65 which may be firmly secured to driver unit supporting bracket 64 by means of the threaded fastenings 65 or other suitable means.

A rotary motion imparting means such as, for example, an air motor 66, deriving air under pressure through an inlet 35, or any other suitable device is inserted through opening 67 in the driver frame member 56. In the embodiment illustrated, the track plate 60 is provided with a semi-circular opening 68 in registering relation with the opening 67, to allow clearance to permit mounting of the air motor 66. A shaft 69 extends vertically upwardly from the motor 66. A knurled driver ring 70 and a flat retaining collar 71 are rigidly secured to the shaft 69 by means of a threaded nut 72 or any other desired means.

A spring loaded pressure arm 73 having a handle portion 74 is pivotally mounted to the driver frame member 56 by means of a threaded fastening 75 which extends through registering openings 76. The openings 76 are vertically disposed and extend through the driver frame member 56 and the pressure arm 73, as illustrated in Fig. 6. A relatively shallow spring receiving opening 77 is provided in the pressure arm 73. The opening 77 is adapted to receive an adjustable compression spring 78 which extends into the spring receiving opening 59 in the lug member 57.

A horizontal holding bar 79 is secured by welding or other suitable means to the top of the pressure arm 73. A vertical pin 80 is tightly positioned into a vertical receiving opening 81 and is disposed through the holding bar 79 adjacent the end thereof. A freely rotatable idler wheel 82 is secured onto the vertical pin 80. As shown in Figs. 5 and 7, the idler wheel is positioned so that it is in substantial horizontal alignment with the knurled portion of the driver ring 70. As will be apparent from a description of the operation of the device hereinafter set forth, the idler wheel 82 is adapted to maintain a strap or banding means 55 firmly against the knurled driver ring 70. The compression spring maintains the idler wheel 82 firmly against the strap means at all times. If desired, the idler wheel 82 may be moved away from the knurled driver ring 70 for adjustment or inspection by moving the connected handle portion 74 outwardly in pivotal relation about the threaded portion 75 as shown in the broken line portion of Fig. 5. The compressive force of the compression spring 78 may be varied by moving the threaded bolt 83 axially inwardly or outwardly as desired, through the threaded nut 84, which is firmly secured to the outer face of the lug member 57. A flat spring receiving and retaining disk 85 is interposed between the outer end of the compression spring 78 and the adjacent free end of the threaded bolt member 83.

As best illustrated in Figs. 5 and 6, an input track member 86 is rigidly secured to the track plate 60 by means of an L-shaped bracket member 87. A smaller output track member 88 is likewise secured to the opposite portion of the track plate 60 by means of a similar bracket member 87. Both the input track member 86 and the output track member 88 are preferably of the cross section illustrated in Fig. 12. The alignment of the track members 86 and 88 and the adjacent track plate 60 with respect to the driver frame member 56 may be adjusted by loosening the threaded fastening 62 and pivoting the members 86 and 88 thereabout. An auxiliary track 89 having a cross-sectional area, as shown in Fig. 11, is pivotably connected to the input track member 86 by means of a pivot pin 90. The free end of the auxiliary track 89 is adapted to abut the track inlet end 43 as shown in Fig. 3. In the particular embodiment illustrated, a portion of the track 89 is curved so that both ends thereof are in alignment with the adjacent portions of the driver unit D and the input track end 43.

Any suitable strap fastening, tightening and securing means E may be employed to secure the strapping or banding means 55 together. A standard commercial strap securing means is illustrated in Figs. 17, 18 and 19 and consists of a knurled tightening wheel 91 which is adapted to engage the strapping material 55 to tighten it in position. Ratchet type dogs 92 also engage the strap 55 to hold it in position as it is tightened in place. The tightening wheel 91 is activated by moving a tightening handle 93. The overlapping portions of the strap 55 are positioned between the tightening wheel 91, and the ratchet dogs 92 are secured permanently together by means of metal seals 94, shown in Fig. 8, maintained in a reserve chamber 95. After the overlapping portions of the strap 55 are secured in place, the strap is severed by shears 96 as shown in Fig. 19. In the particular strap tightening and securing device E, as illustrated, the seals are applied and the strap is cut by movement of the sealing handle 97. It should be noted that various other, similar strap or band fastening, tightening and securing means E may be employed if desired.

The top sealing means A, which is shown in Figs. 1 and 2, is similar to the bottom sealing means B, however, in the embodiment illustrated, the top frame member 30' is a solid member, since it is not provided with an opening, such as found at 32 in the bottom frame member 30. The top frame member 30' is secured directly to a top shaft 34' which is operably disposed within a top air cylinder 33' having top and bottom air inlet openings 35'. The top frame member 30' is provided with similar, downwardly disposed closure forming guides 29 which support a two-piece top track unit C'. A similar auxiliary track member 89' is secured to the outlet end 44' of the top track member C' by means of a top pivot pin 90'. Also, a similar top strap tightening and securing member E' is rigidly secured to a top horizontal plate 98' which rigidly supports a top pivot pin 99'. As shown in Fig. 1, in reverse to the mounting arrangement of the lower strap tightening and securing device in E, the upper tightening and securing device E' is mounted in an inverted position, with the top pin 99' extending upwardly through the top frame member 30'. In this manner, the strap tightening and securing means E may be swung outwardly away from the strap member 55 as illustrated in Fig. 3. Similarly, a top driver unit D' is secured to the top frame 30' in a position which is the inverse of the bottom driver unit B.

Process of operating the device

For purposes of illustration, the machine is shown in Fig. 2 with a rectangular container F having upper and lower body end flaps 100, and top and bottom closure caps 101. Each individual closure cap, illustrated in detail in Fig. 9, is provided with a closure panel 102 having side marginal flaps 103 each with edge flaps 104. In the particular container illustrated, the side flaps 103 and edge flaps 104 are secured together by stitches 105 to position the edge flaps 104 for interlocking engagement with the lower body end flaps 100. The container member F is provided with connected together side walls 106.

One preferred mode of operation of the machine is to place a tubular container body on a bottom closure cap 101 which has been placed upon the input conveyor section 20 as illustrated in Fig. 2. It is important that the bottom closure cap edge flaps 104 are positioned upwardly adjacent the upwardly disposed end flaps 100. The container is then loaded and a similar upper closure cap 101 placed on the top of the tubular body walls 106. Again, it is necessary that the edge flaps 104 be positioned downwardly adjacent the upper end flaps 100. The container is now ready to be closed and sealed. With the vertically movable conveyor section 25 positioned in substantial horizontal alignment with the input conveyor section 28 and the top sealing means retracted upwardly, as shown in Fig. 1, the container, together with the previously positioned top and bottom closure caps, is moved into the rollers 27 on the movable conveyor section 25 so as to be in vertical alignment with the top and bottom sealing means A and B. With the container F in this position, the top and bottom strap tightening and securing means E and E' are swung outwardly away from the container as illustrated in Figs. 1 and 3. Both the upper and lower auxiliary track members 89 and 89' are swung into horizontal position as shown in Figs. 2 and 3. The container is now ready to be sealed.

The operation of the device is most readily apparent from Figs. 13 to 16 inclusive. As described previously, a suitable air pressure supply system is provided to activate the various movable components of the machine, such as the various air clamps 51 and the cylinders 33 and 33'. The compressed air may be derived from any convenient source, such as a compressor or pressure tank, not illustrated. Also employed in the embodiment of the device illustrated is an electrical control system which may derive its source of energy from any convenient means, such as a battery, as illustrated.

The sequence of closing operations is begun by moving the top air control valve 107 into the position shown in Fig. 13 to direct the inlet air into the top air cylinder 33' at the top air inlet opening 35', thus causing the top sealing means A to move slowly downwardly into engagement with the previously positioned top closure member 101. As the top sealing means A continues its descent, as shown in Figs. 14 and 15, the top switch 108 is released, closing the circuit to the interval timer T, thereby causing it to operate for a given period of time. When the timer T is in operation, the circuit is closed to the solenoid 109. The timing solenoid 109 is thus activated, thereby opening the bottom air motor valve 110 which, in turn, activates the top and bottom air motors 66 and 66' to drive a predetermined length of strap or other securing means 55 from the source G into the two-piece track member C. When the appropriate length of strap 55 has been fed into the track members C, and predetermined lengths of strap are in overlapping relation as shown in Fig. 3, the timer T interrupts the current to the metering solenoid 109 and the air motor valve 110 is closed. The metering of the strapping means 55 in no way affects the continuing operation of the top and bottom sealing means A and B. Thus, as the top sealing means A continues downwardly, as shown in Fig. 15, the side switch 111 is closed, thus activating a bottom solenoid 112 which, in turn, opens a bottom air valve 113 to open the bottom air cylinder 33 through the outlet air tube 36 to the atmosphere. Thus, the bottom shaft 34 and its connected piston are free to be forced downwardly into the bottom air cylinder 33 by the continued downward movement of the top air cylinder 33' against the container F. As the bottom shaft 34 is forced to the lower limit of its travel, the movable conveyor section 25 is held firmly in position. In the meantime, the container lower end flaps 100 and the bottom closure flaps 103 and 104 have been automatically forced into interlocking relation together as they have been forced through the bottom forming guides 29, as shown in Fig. 15. Simultaneously, as the bottom sealing means reaches the lowermost portion of its travel, an air clamp switch 114 is closed, thereby activating the air clamp solenoid 115 which, in turn, activates an air clamp valve 116 so that air under pressure is supplied to the various air clamps 51. This acts to force the top tracks 49 of the bottom sealing means B upwardly and the bottom track 49' of the top sealing means A downwardly, simultaneously away from their adjacent track members 45 and 45'.

Auxiliary track members 89 and 89', as shown in Fig. 2, are swung manually upwardly and downwardly respectively away from the adjacent input track members 86. The top and bottom strap tightening and securing means E and E' are pivoted inwardly about the pin 99, as shown in Fig. 3, to a position against the adjacent side marginal flaps 103 and the previously positioned strapping 55. The bottom strap tightening and securing means E is then raised sharply upwardly. Similarly the top strap and securing means E' is moved sharply downwardly. In this manner both of the devices E and E' are in engaging relation with the ends of the previously positioned strapping means 55 in a manner illustrated in Fig. 17. With the free end of the bottom closure strapping means 55 firmly held between ratchet dogs 92, the tightening handle, as shown in Fig. 18, is moved to activate the knurled tightening wheel 91 so as to firmly secure the strap 55 in position. The sealing handle 97 is then moved into position, as shown in Fig. 19, and the adjacent overlapping ends of the strap 55 are automatically secured together by a metallic seal 94, not shown. Simultaneously and automatically, with the movement of the sealing handle 97, the shears 96 sever the connected portion of the strapping means. Following the sealing operation, the bottom tightening and securing means E is moved sharply downwardly away from the secured strap and swung horizontally outwardly. In a similar manner, after the upper tightening and securing means E' is operated to tighten the top closure strapping 55 and secure it into position, the device E' is moved upwardly and outwardly out of engagement with the strapping means 55. The upper and lower auxiliary tracks 89 are then swung into position so that their free end edges are positioned adjacent the inlet track member 43. The top air control valve 107 is then manually positioned, as shown in Fig. 16, to direct the air pressure through the bottom inlet air opening 35' against the top cylinder 33' so as to drive the top sealing means A upwardly away from the sealed container. As shown in Fig. 16, as the top sealing means raises, the side switch 111 will be released, thereby causing the bottom solenoid 112 to close the bottom air valve 113. The air pressure is then directed against the bottom face of the piston in the bottom air cylinder 33 to force it upwardly into horizontal alignment with the conveyor sections 20 and 21 as shown in Fig. 2. As the bottom sealing means B moves upwardly, the air clamp switch 114 is released, thereby activating the air clamp solenoid 115 to turn the air clamp valve 116 to release the pressure on the air clamps 51 to lower the top track 49 of the bottom sealing means B and the bottom track 49' of the top sealing means A into position as shown in Fig. 4.

The completely closed and sealed container now appears as illustrated in Fig. 8 and may now be moved from the movable conveyor section 25 onto the output conveyor section 21 and a new, unsealed container member, with top and bottom closure members 101, may be moved into position. The process is then repeated.

With the process and apparatus described, it is possible to interlock the top and bottom closure members on the container body, then band and seal the closure members permanently in place with a minimum of manual assistance. At no time during the operation is it necessary to handle either the container or the banding means. The device described is readily adapted to permit the use of various types and styles of strap tightening and securing means. Also, while in the particular embodiment described, a high pressure air system in conjunction with an electric control system has been employed, it is apparent that other motion imparting means may be used if desired. For instance, a hydraulic system might be used or, if desired, a completely electric system might be employed. Also, the novel process of applying the banding means may be carried out by machines which are modified from the particular apparatus illustrated. It is also contemplated that the structure of the two-piece guiding track C may be modified within the spirit and scope of the invention. For instance, it may be desirable to change the configuration or operation of the movable track portion to suit a particular type of installation. The invention may be employed in modified devices, for example, in installations where the container member employs only a single closure member. In that instance, only a single sealing means would be utilized. These and other modifications fall within the intended limits of the invention.

Further, various other types of containers may be closed and sealed in modified devices employing the invention. For example, containers which are octagonal or hexagonal in cross section may be closed and sealed by modifying the shape of the track members C and C' and the placement of the closure forming guides 29. Also, containers employing modified styles of end closure caps which must be banded may also be effectively sealed by machines employing this invention.

What we claim is:

1. An apparatus for closing and sealing containers of the type requiring a girding, encircling band comprising a band guiding track positioned about the container and having a movable side portion positioned adjacent the container, means for driving a predetermined length of band into the guiding track in a loop about the container, the movable track side portion being disposed intermediate the band disposed within the track and the adjacent container parts, means for retracting the track movable side portion in a direction parallel to the adjacent container parts and tensioning means to draw the loop inwardly from the track into contacting relation with the container and means for permanently securing the encircling band into girding position about the container.

2. An apparatus for closing and sealing containers of the type requiring a girding, encircling band comprising a band guiding track generally fixed with respect to adjacent container parts and a movable side portion positioned closely adjacent the container, means for driving a predetermined length of band from a source into the guiding track, means for retracting the track side portion and means for severing the band from the source and permanently securing it into position about the container.

3. An apparatus for closing and sealing containers of the type requiring a girding, encircling band comprising means for supporting the container, a band guiding track having a movable side portion positioned adjacent to and in encircling relation about the container, means adapted for driving a predetermined length of band from a source into the guiding track to form a loop about the container, said movable side portion being disposed intermediate the container and the encircling band, means for retracting the movable track side portion in a direction parallel to the adjacent container portions and means for shrinking the loop and severing it from the source and permanently securing it into position about the container.

4. An apparatus for closing and sealing containers of the type requiring a girding, encircling band comprising means for supporting the container in operating position, a band guiding track generally fixed with respect to adjacent container parts and having a movable side portion adjacent the container and positioned about the container, means for driving a predetermined length of band to gird the container from a source into the guiding track, controlled means for substantially simultaneously retracting the movable track side in a parallel direction with respect to adjacent portions of the container, and means for withdrawing the band from the track onto the container and means for severing the band from the source and permanently securing it into girding position about the container.

5. An apparatus for applying a banding means to a container having a body, top and bottom closure caps with marginal flaps thereon, the apparatus comprising a vertically movable, supporting base with stationary forming guides adapted to position the marginal bottom cap flaps against the container body, a vertically movable top cap forming device having forming guides adapted to position the top cap flaps against the container body, the top and bottom forming guides each having a band guiding track with a movable inner side portion adapted to be positioned adjacent the respective top and bottom closure caps, timed, metering means for driving from a source a predetermined length of banding means through each of the guiding tracks to form a loop about the container, means for retracting the movable inner side portions of each of the guiding tracks, a band tensioning and securing mechanism for retracting the loop of banding out of the respective guiding tracks and firmly onto the side surfaces of the adjacent container closure caps and securing the banding permanently in place, means for severing the secured banding from the source.

6. An apparatus for applying a banding means to a container having a body and an end closure cap with marginal flaps thereon, the apparatus comprising a flat supporting base with upstanding, spaced forming guides positioned in upright relation to the supporting base and adapted to position the marginal closure cap flaps against the container body, the forming guides having notches adapted to receive a band guiding track disposed in substantially parallel relation to the supporting base, the band guiding track being provided with a vertically movable inner side portion adapted to be positioned closely adjacent the closure cap marginal flaps, means for driving from a source a predetermined, metered length of banding means through the band guiding track to form an encircling loop about the closure cap marginal flaps with the free end of the banding means being in overlapping relation with an adjacent portion of the banding means, means for retracting the vertically movable band guiding track side portion, a loop shrinking and band securing mechanism for retracting the band out of the guiding tracks and firmly onto the side surfaces of the closure cap marginal flaps and securing the overlapping portions of the band permanently together and means for severing the secured band from the source.

7. An apparatus for applying a banding means to an upstanding container having a tubular body and a top and bottom closure cap each with marginal flaps thereon, the apparatus comprising a flat supporting base with an opening therethrough adapted to receive the bottom end closure cap, the supporting base being provided with spaced forming guides positioned adjacent the opening in upright relation with the supporting base and adapted to position the marginal closure flaps of the bottom cap in upright relation against the tubular container body, a vertically movable, horizontal bottom closure cap receiving means positioned within the opening in the supporting base, a top, vertically movable plate having downwardly depending, vertically disposed, spaced forming guides positioned in right angular relation to the top plate and adapted to position the marginal closure flaps of the top cap against the container body, both the bottom and the top forming guides having notches adapted to receive a band guiding track disposed in substantially parallel relation to the adjacent respective bottom supporting base and top plate, each band guiding track being provided with a vertically movable, inner side portion adapted to be positioned closely adjacent the closure cap marginal flaps, means for driving from a bottom and top source a predetermined, metered length of banding means through the bottom and top guiding tracks to form encircling loops about the respective closure cap marginal flaps with the free ends of the banding means being in overlapping relation to the adjacent portions of the banding means, means for retracting the vertically movable top and bottom band guiding track side portions, a top and bottom loop shrinking and band securing mechanism for retracting the bands out of their respective tracks and firmly onto the adjacent side surfaces of the respective top and bottom closure cap marginal flaps and securing the overlapping portions of the bands permanently together, and means for severing the secured bands from their respective sources.

8. A device for closing and sealing upstanding containers of the type requiring a girding, encircling band, means for supporting the container in operative relation with respect to the device, a band guiding and receiving track disposed in encircling relation about the container and comprising a vertically retractable side element having a vertical side portion disposed adjacent the container, and a stationary side element having a vertical side portion and a horizontal bottom portion, the retractable side element being vertically movable to permit horizontal withdrawal of the band out of the track onto the container.

9. The method of closing and sealing a container having a preformed body portion and a closure cap with side marginal flaps which comprises the steps of feeding a predetermined length of banding means into a track generally fixed with respect to the closure marginal flaps and encircling the marginal flaps and having a movable side portion positioned adjacent to the container body, withdrawing the movable track side portion in a parallel direction to the marginal flaps and tightening the banding means out of the encircling track into firm contacting engagement with the container body, securing the ends of the banding means permanently together.

10. The method of closing and sealing an upstanding container having a body portion and an end closure cap with depending side marginal flaps thereon adapted to be positioned adjacent the body portion, including the steps of moving the body portion and the end closure cap to a position adjacent a sealing mechanism and positioning the sealing mechanism adjacent the side marginal flaps of the end closure cap, feeding a predetermined length of banding means into a generally fixed track disposed within the sealing means and having a retractable side portion positioned adjacent the marginal flaps, withdrawing the retractable track side portion in a direction parallel to the adjacent side marginal flaps and tightening the banding means out of the encircling track into firm contacting engagement with the side marginal flaps to secure them into position, permanently securing the ends of the banding means and severing the banding means from a supply.

References Cited in the file of this patent

UNITED STATES PATENTS

| Re. 5,893 | Myers | May 26, 1874 |
| 2,632,381 | Buckland | Mar. 24, 1953 |